Oct. 20, 1931.     D. GROSSO     1,828,602

SHOCK ABSORBER FOR VEHICLES

Filed Oct. 12, 1928     4 Sheets-Sheet 1

Inventor
Dante Grosso
By
Attorney

Oct. 20, 1931. D. GROSSO 1,828,602
SHOCK ABSORBER FOR VEHICLES
Filed Oct. 12, 1928 4 Sheets-Sheet 3
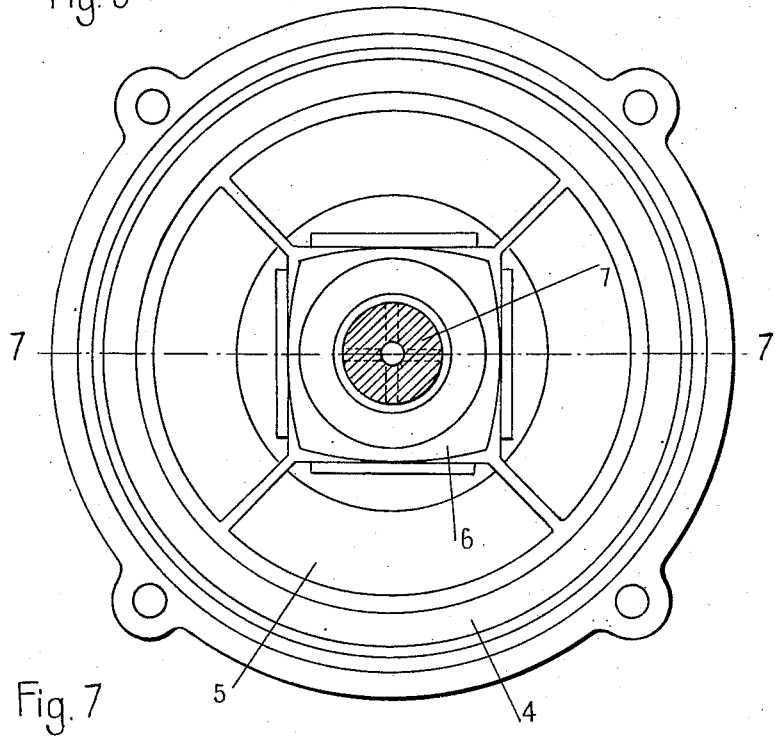
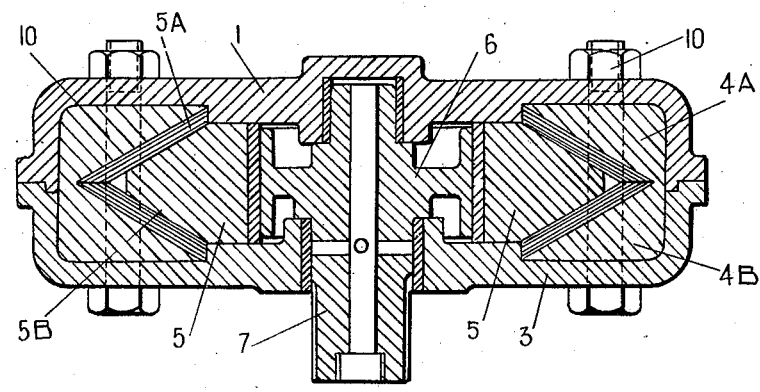
Inventor
Dante Grosso
By
Attorney Oct. 20, 1931. D. GROSSO 1,828,602
SHOCK ABSORBER FOR VEHICLES
Filed Oct. 12, 1928 4 Sheets-Sheet 4

Inventor
Dante Grosso
By
Attorney

Patented Oct. 20, 1931

1,828,602

UNITED STATES PATENT OFFICE

DANTE GROSSO, OF SAGLIANO MICCA, BIELLA, ITALY, ASSIGNOR TO OFFICINE MECCANICHE FRATELLI GROSSO & TRIBOLA, SAGLIANO MICCA, BIELLA, ITALY

SHOCK ABSORBER FOR VEHICLES

Application filed October 12, 1928, Serial No. 312,079, and in Italy October 13, 1927.

My invention relates to shock absorbers for vehicles, particularly for automobiles, and has for its main object to provide a friction shock absorber of a generally improved character; the same being of a novel and simple design and of a sturdy construction insuring its durability, and being adapted to be produced at relatively low cost.

A further object of my invention is to provide means of a novel and improved character for connecting the shock absorber to the part of the vehicle actuating the same.

A primary feature of my invention is that the shock absorption is effected by reason of the transversal or circumferential friction or both arising between a member fixed to one part of the vehicle and another member connected to another part thereof, said parts being vertically movable in respect to each other; the shocks to which one of said parts may be subjected being absorbed by the shock absorber for the purpose of preventing their being transmitted to the other part. Generally one of said parts is the vehicle frame, while the other part is one of the vehicle axles.

A shock absorber made according to this invention, comprises a box preferably fixed to the vehicle frame, said box enclosing a peripheral band of a relatively soft and rough-faced material, such as rubber, fibre, compressed mohair belt, or the like; said band preferably consisting of an outer part of rubber or other material providing the necessary cushioning effect and an inner lining providing the required frictional surface; said lining being made out of canvas, belting or felt or other material to a certain extent yielding, having a relatively high coefficient of friction. The device also comprises a number of metal shoes slidably contacting with their outer faces against said band, or, in the preferred form, against its lining, and a central hub or core retaining in position said shoes and carrying an operating lever preferably formed with a number of faces corresponding to the number of shoes; said faces being shaped so as to enable the hub to undergo small angular displacements in both directions with respect to the shoes. The general cross section of the hub, and particularly the shape of the peripheral faces thereof, is such that under certain operative conditions the hub will be capable of causing the shoes to follow its angular displacements and circumferentially slide against the peripheral band or lining, while under other operative conditions the hub will impart to said shoes a radial thrust, thus forcing them to adhere to said band or lining and giving rise to a sudden and strong braking action which will stop the vibrations of the vehicle frame with respect to the vehicle axle.

This effect is due to the eccentricity of the peripheral faces of the hub, as will be explained.

According to one embodiment of the invention, the hub comprises convex peripheral faces, the shoes having plane inner faces.

According to another embodiment, a hub comprises plane peripheral faces, while the shoes have convex inner faces.

The curvature of the cylindrical faces, of either the hub or the shoes, may be symmetrical but need not necessarily be so.

According to another embodiment of the invention, the peripheral portions of the shoes are V-shaped, or truncated-cone-shaped, or conoidical, so that the cross section of a shoe will be in the form of a wedge, the peripheral band being correspondingly shaped, and being preferably formed by two juxtaposed sections; and the shoes, under the action of the hub, will act as wedges between the sections of the band.

According to one feature of the invention the operating lever, rigidly keyed at one end to an axial extension of the hub, is ball-headed at the opposite end, forming a part of a ball socket joint carried by a rigid connecting rod attached to the chassis or like member of the vehicle.

In the preferred embodiment of my invention, however, the connection between the oscillating hub lever and the vehicle member referred to is provided by a rod resilient per se, said rod being connected at one end to the lever and at the opposite end to the vehicle member. According to one embodiment, the rod may consist of a single member such as a strong helical spring, or a rubber bar of polygonal or cylindrical section, the ends of which are fixed to the parts referred to. According to the preferred embodiment, however, a composite construction is provided, consisting of two or more rubber heads connected to each other by metallic connecting rods, said rods being suitably secured to said heads.

Figures 8, 9, 10, 11:
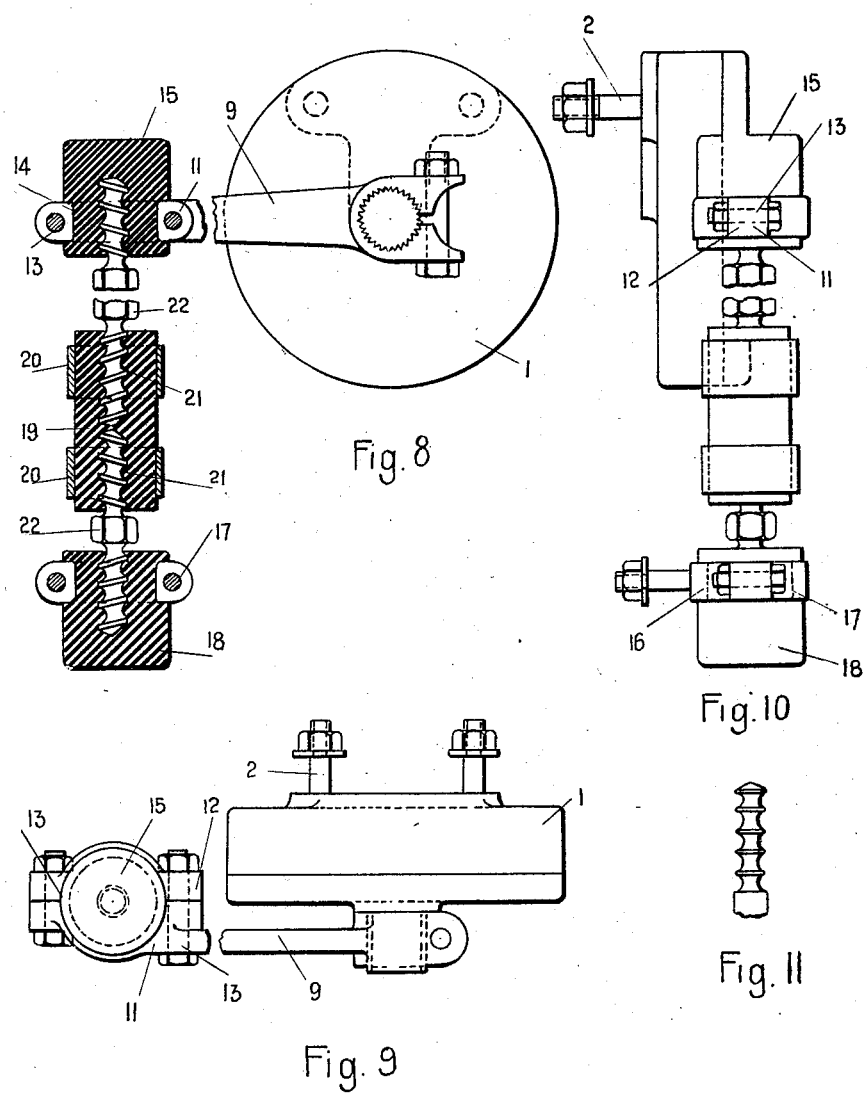

Fig. 6 has a front elevation partly sectioned of another device embodying my invention in a modified form, with the cover removed to show the interior;

Fig. 7 is a diametral cross section thereof through line 7—7 of Fig. 6;

Fig. 8 is a fragmentary side elevation partly sectioned of a device embodying my invention illustrating an improved non-rigid connection which may be used to actuate the same;

Fig. 9 is a plan view of the same;

Fig. 10 is a side elevation thereof; and,

Fig. 11 is a detailed fragmentary view of an alternative construction of connected rod.

Figure 1:
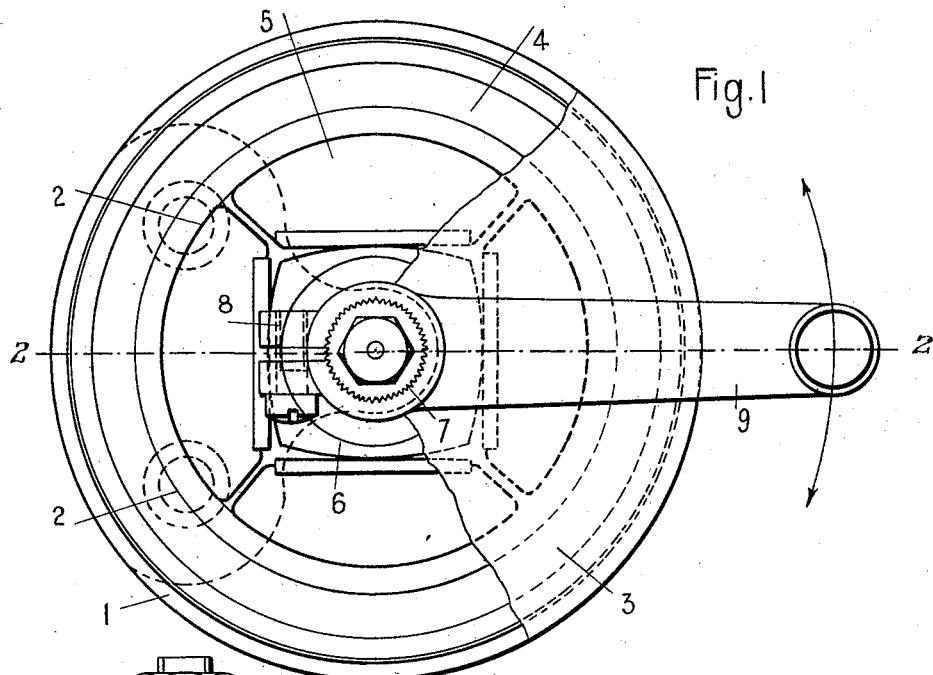
Fig. 1 is a front elevation of a shock absorber embodying my invention, with certain parts broken away to show the interior.
Figure 2:
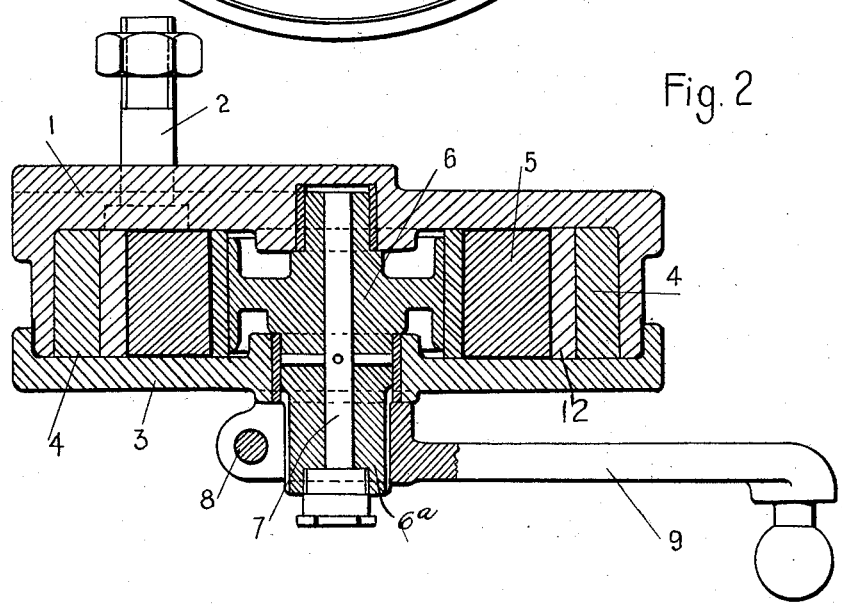
Fig. 2 is a diametral cross section thereof through line 2—2 of Fig. 1.

Referring first to Figs. 1 and 2, 1 is a cylindrical box which may be fixed by any suitable means, such as bolts 2, to the vehicle frame, and is provided with a cover 3. Within said box, close to its inner wall is inserted a peripheral band, 4, made of elastic material such as rubber for instance, said band having a rough inner surface or else being used in conjunction with a lining such as 12 made of to a certain extent yielding material, such as canvas, felt or the like, having a surface the coefficient of friction of which is relatively high.

The inner surface of the band or of the lining is smooth enough to permit the shoes 5 to slide against the same when the hub is angularly displaced at relatively low speed, causing said shoe to follow said hub.

The peripheral faces of the hub 6 normally abut against the corresponding faces of the shoes 5. In each set of faces thus in contact, one face has a suitable convexity while the other is plane. Thus, in the drawings it is seen that the peripheral faces of the hub 6 have a suitable convexity, which for the sake of clarity is magnified in the drawings, said faces normally abutting against the corresponding inner faces of the shoes 5, so that at rest, the convexity being relatively small, the respective faces will practically adhere to each other over practically their entire surface. A lever 9 is secured onto an axial extension 6a of hub 6 by means of a bolt 8.

Under these conditions, a comparatively slow and progressive partial rotation of the hub, which is positively operated by the lever 9, will cause the shoes to follow and slide in either direction against the inner surface of the peripheral band or inner lining thereof. This normally happens in connection with all oscillations or vibrations of the axle which are due to normal irregularities of the road. However, when a vehicle wheel and the axle thereof receive a sudden and powerful shock, the hub is suddenly forced to make a movement of partial rotation, which the shoes cannot follow because of their friction against the peripheral band or lining; as a result, they will be forced outwardly in a radial direction and pressed against the latter, thus providing an efficient braking action and stopping or absorbing the vibration of the axle and wheel.

In the constructions shown the faces of the hub have symmetrical convexities, and they will therefore brake in either direction in the same ratio. However, the outline of each face may be altered to suit special conditions if desired, as will be understood.

Figure 5:
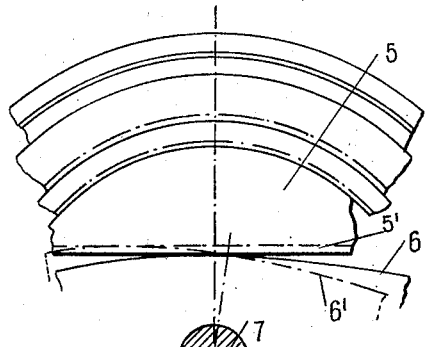
Fig. 5 is a diagram illustrating the action of a device embodying my invention.

The action due to the eccentricity of the hub faces relative to its axis of rotation, is diagrammatically shown in Fig. 5.

When the convex face of hub 6, subsequent to a sudden angular displacement thereof in the direction of the arrow F about pivot 7, reaches the position 6' its point of contact with the shoe becomes displaced laterally of its central line, said new point of contact being at a distance from the center of rotation of the hub, greater when the distance separating said center from the central or normal point of contact. The shoe will therefore be forced to the position 5', thereby compressing to a certain extent the lining and the peripheral band.

Figure 3:
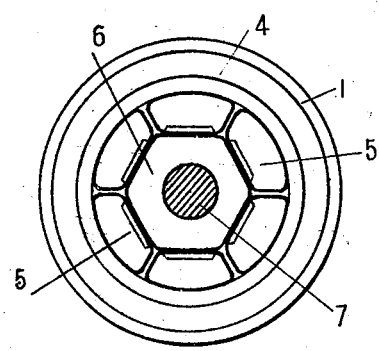
Figs. 3 and 4 are partial side elevations of alternative embodiments of my invention.
Figure 4:
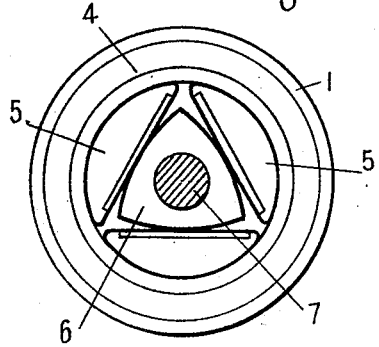

While in Fig. 1 four shoes 5 and a corresponding four-faced hub 6 are shown, Fig. 3 shows an embodiment having six shoes, and Fig. 4 a further embodiment with three shoes, but it will be understood that their number may be varied at will and that they need not be equal to each other.

While I have described the apparatus provided with metal shoes and a rough and compressible band, I may instead provide shoes made of resilient material and a metal band, without departing from the scope of the invention.

In Figs. 6 and 7 I have shown a modified arrangement to increase the contacting surfaces of the movable parts, thereby improving the braking action of the absorber.

In the same the box is formed by two halves 1'', 3'', which are connected together by bolts 10 or the like. The shoes 5'' are wedge-shaped, and cooperate through their opposite faces 5A and 5B with the inner faces of linings 12A, 12B inserted over a pair of compressible and rough-faced bands 4A and 4B, respectively.

The operation of the hub 6" relatively to the shoes is the same as in the former embodiment; in this case, however the shoes tend to wedge in between the compressible bands and give rise to some axial component of the braking action of the absorber.

In Figs. 8, 9 and 10 I have shown a preferred arrangement of means for connecting the oscillating lever to the corresponding part of the vehicle. It has been found that, owing to the very small amplitude, the frequency and the considerable force of the oscillations due to shocks, any rigid connection such as those heretofore used and that partially shown as a ball socket joint at the free end of the lever 9 in Figs. 1 and 2, are usually subjected to a very considerable wear, the ball member or any like part becoming easily flattened or deformed so that the device eventually becomes unsatisfactory and the connection noisy.

By virtue of said arrangement, the connection between the oscillatory lever and the corresponding portion of the vehicle is made by means of a rod elastic in itself, which is rigidly connected at its ends to the lever and vehicle, respectively.

Any suitable elastic structure may be used. In practice, I prefer to provide a composite construction, consisting of two or more hard rubber blocks, connected to each other by means of an intermediate member which also is preferably elastic to a certain extent or otherwise connected to the attaching means of the device.

As shown in Figs. 8, 9 and 10, the lever 9 terminates with a collar made in two sections 11 and 12 connected together by bolts 13 and engaging an annular groove 14 of a rubber block 15.

A like collar 16, 17 encircles another rubber block 18, and intermediate of the blocks 15 and 18 a rubber cylinder 19 is provided, reinforced by rings 20 near its ends, the connection of the blocks 15 and 18 with the cylinder 19 being provided by rods 21 the ends of which are preferably threaded and penetrate said blocks. The intermediate portions 22 of the helically threaded rods 21 are preferably polygonal in section, so that they may easily be engaged by a wrench when adjustment or repair of the composite rod is required. Fig. 11 shows an alternative construction of connecting rod, in which a plurality of annular grooves has been substituted for the continuous thread of rods 21.

Devices embodying my invention may be constructed differently from those shown without departing from the inventive idea; the drawings will therefore be understood as being intended for illustrative purposes only and not in a limiting sense.

I accordingly reserve the right to carry my invention into progress in all those ways and manners which may enter fairly in the scope of appointed claims.

I claim:

1. In a device of the class described the combination, with a member having a circumferential frictional surface, of a member provided with an eccentric surface pivotally mounted concentrically of said frictional surface, and a floating shoe member interposed between said eccentric surface and said frictional surface, said shoe member being frictionally engaged by said eccentric surface and being adapted to follow its angular displacements in both directions, and normally having a limited portion of its surface outwardly movable in relation to said pivotally mounted member, towards said frictional surface, when the tangential force exerted by said eccentric surface is sufficient to overcome the frictional resistance between said surface and the surface of said shoe member.

2. In a device of the class described, a member having a reaction surface and a circumferential frictional surface, a body of resilient material interposed therebetween, a member provided with an eccentric surface pivotally mounted concentrically of said frictional surface, and a floating shoe member interposed between said eccentric surface and said frictional surface, said shoe member normally having a limited portion of its surface frictionally engaged by said eccentric surface and being adapted to follow its angular displacements in both directions, and being outwardly movable in relation to said pivotally mounted member, towards said frictional surface, when the tangential force exerted by said eccentric surface is sufficient to overcome the frictional resistance between said surface and the surface of said shoe member.

3. In a device of the class described the combination, with a casing carrying a circumferential inner frictional surface, of a hub rotatably mounted concentrically of said surface, said hub being provided with cam-acting peripheral surfaces, and floating shoe members normally having a limited portion of their inner surface frictionally engaged by said cam-acting surfaces, said shoe members being interposed between said cam-acting surfaces and said frictional surface and being outwardly movable in relation to said hubs.

4. In a device of the class described the combination, with a casing having a reaction surface, of a hub rotatably mounted in relation to said surface, said hub being provided with cam-acting peripheral surfaces, floating shoe members normally having a limited portion of their inner surfaces frictionally engaged by said cam-acting surfaces, interposed between said cam-acting surfaces and said reaction surface, and a resilient body, having a frictional surface concentric to the axis of said hub, interposed between said shoes and said reaction surface, said shoe members being outwardly movable in a radial direction in relation to said hub.

5. In a device of the class described the combination, with a casing having a reaction surface, of a hub rotatably mounted in relation to said surface, said hub being provided with cam-acting peripheral surfaces, floating shoe members normally having a limited portion of their inner surfaces frictionally engaged by said cam-acting surfaces, interposed between said cam-acting surfaces and said reaction surface, a resilient body having its inner surface concentric to the axis of said hub, interposed between said shoes and said reaction surface, and a lining for said concentric surface, providing a substantially uniform surface having a relatively high coefficient of friction, said shoe members being outwardly movable in a radial direction in relation to said hub.

6. In a device of the class described the combination, with a casing carrying a circumferential inner frictional surface, of a hub rotatably mounted concentrically of said surface, said hub being provided with cam-acting peripheral surfaces, and floating shoe members interposed between said cam-acting surfaces and said frictional surface, said shoe members having their inner surfaces frictionally engaged by said cam-acting surfaces, each set of contacting surfaces comprising a curved surface and a plane surface.

7. In a device of the class described the combination, with a casing carrying a circumferential inner frictional surface, of a hub rotatably mounted concentrically of said surface, said hub being provided with cam-acting peripheral curved eccentric surfaces, and floating shoe members interposed between said cam-acting surfaces and said frictional surface, said shoe members each having a plane inner surface frictionally engaged by one of said cam-acting surfaces, and being outwardly movable in relation to said hub.

8. In a device of the class described the combination, with a casing having a reaction surface, of a hub rotatably mounted in relation to said surface, said hub being provided with cam-acting peripheral surfaces, floating shoe members interposed between said cam-acting surfaces and said reaction surface, said shoe members having their inner surfaces frictionally engaged by said cam-acting surfaces, each set of contacting surfaces comprising a curved surface and a plane surface, said shoe members being outwardly movable in relation to said hub and having their outer surfaces concentric to the axis thereof, and a resilient body, having a frictional surface concentric to the axis of said hub, directly opposite the outer surfaces of said shoes, interposed between said shoe members and said reaction surface.

9. In a device of the class described the combination, with a casing having a reaction surface, of a hub rotatably mounted in relation to said surface, said hub being provided with cam-acting peripheral surfaces, floating shoe members interposed between said cam-acting surfaces and said reaction surface, said shoe members having their inner surfaces frictionally engaged by said cam-acting surfaces, each set of contacting surfaces comprising a curved surface and a plane surface, said shoe members being outwardly movable in relation to said hub and having inclined outer surfaces concentric to the axis thereof, and a resilient body, having frusto-conical frictional surfaces concentric to the axis of said hub, directly opposite the outer surfaces of said shoe members, interposed between said shoes and said reaction surface.

10. In a device of the class described the combination, with a casing having a reaction surface, of a hub rotatably mounted in relation to said surface, said hub being provided with cam-acting peripheral surfaces, floating shoe members interposed between said cam-acting surfaces and said reaction surface, said shoe members having their inner surfaces frictionally engaged by said cam-acting surfaces, each set of contacting surfaces comprising a curved surface and a plane surface, said shoe members being outwardly movable in relation to said hub and having their outer surfaces concentric to the axis thereof, a resilient body, having its inner surface concentric to the axis of said hub, interposed between said shoes and said reaction surface, and a lining for said inner surface, having a substantially uniform surface with a relatively high coefficient of friction, directly opposite the outer surfaces of said shoe members.

11. In a device of the class described the combination, with a casing having a reaction surface, of a hub rotatably mounted in relation to said surface, said hub being provided with cam-acting peripheral surfaces, floating shoe members interposed between said cam-acting surfaces and said reaction surface, said shoe members having their inner surfaces frictionally engaged by said cam-acting surfaces, each set of contacting surfaces comprising a curved surface and a plane surface, said shoe members being outwardly movable in relation to said hub and having inclined outer surfaces concentric to the axis thereof, a resilient body, having frusto conical inner surfaces concentric to the axis of said hub, parallel to the outer surfaces of said shoe members, and a lining for said inner surfaces, having a substantially uniform surface with a relatively high coefficient of friction, directly opposite the said outer surfaces.

12. A device of the class described, comprising a casing adapted to be attached to a part of a motor car, a hub provided with a plurality of cam-acting peripheral surfaces rotatably mounted in said casing, floating shoe members frictionally engaged by said cam-acting surfaces and outwardly movable in a radial direction in relation to said hub, mounted within said casing, said shoe members having outer surfaces concentric to the axis of said hub, a resilient body, having a frictional surface concentric to the axis of said hub, directly opposite the outer surfaces of said shoe members, and a lever associated with said hub adapted to be connected at its free end to another part of said motor car movable in relation to the part to which the casing is attached.

In testimony whereof I set my hand to this specification.

DANTE GROSSO.